(12) United States Patent
Qing et al.

(10) Patent No.: US 11,650,112 B1
(45) Date of Patent: May 16, 2023

(54) CRACK PROPAGATION AND DEFORMATION MEASUREMENT METHOD COUPLING INFRARED AND VISIBLE LIGHT IMAGES

(71) Applicant: Hebei University of Technology, Tianjin (CN)

(72) Inventors: Longbang Qing, Tianjin (CN); Ru Mu, Tianjin (CN); Li Wang, Tianjin (CN); Guorui Cao, Tianjin (CN)

(*) Notice: Subject to any disclaimer, the term of this patent is extended or adjusted under 35 U.S.C. 154(b) by 0 days.

(21) Appl. No.: 17/969,944

(22) Filed: Oct. 20, 2022

(51) Int. Cl.
*G01L 1/24* (2006.01)
*G01N 3/06* (2006.01)
*G06T 7/11* (2017.01)

(52) U.S. Cl.
CPC ............. *G01L 1/248* (2013.01); *G01N 3/068* (2013.01); *G06T 7/11* (2017.01); *G01N 2203/0066* (2013.01); *G06T 2207/10048* (2013.01)

(58) Field of Classification Search
CPC . G01L 1/248; G06T 7/11; G06T 2207/10048; G01N 3/068; G01N 2203/0066
USPC .......................................................... 73/800
See application file for complete search history.

(56) References Cited

U.S. PATENT DOCUMENTS

| | | | | | |
|---|---|---|---|---|---|
| 5,834,661 | A | * | 11/1998 | Nonaka | G01N 25/72 73/866 |
| 6,516,084 | B2 | * | 2/2003 | Shepard | G01N 25/72 374/10 |
| 10,156,532 | B2 | * | 12/2018 | Isakov | G01J 5/0066 |

FOREIGN PATENT DOCUMENTS

| | | | | |
|---|---|---|---|---|
| CN | 102575993 A | * | 7/2012 | ......... G01N 21/6489 |
| CN | 108662978 | * | 10/2018 | |
| CN | 114216403 A | * | 3/2022 | |
| KR | 20160036179 A | * | 4/2016 | |

* cited by examiner

*Primary Examiner* — Octavia Davis Hollington

(57) ABSTRACT

A discontinuous deformation measurement method based on infrared and visible light cameras may include: preparing a conductive film and a random speckle pattern on a surface of the conductive film; obtaining a visible image and an infrared image under a loading stage; applying a crack boundary detection to the visible image to obtain an initial coordinate of a micro-crack, determining an range of the micro-crack based on a temperature-rising region from the infrared image and the initial coordinate; setting a position corresponding to the range of the micro-crack in the visible image as a new region of interest; obtaining full-field principal tensile strains by a DIC method, and locating an accurate boundary of the micro-crack based on gradient distribution of the full-field principal tensile strains; analyzing displacement and strain fields around the micro-crack using the DIC method.

7 Claims, 9 Drawing Sheets

CRACK PROPAGATION AND DEFORMATION MEASUREMENT METHOD COUPLING INFRARED AND VISIBLE LIGHT IMAGES

CROSS REFERENCE

This application claims priority benefits to Chinese Patent Application No. 202111548480.1, filed Dec. 17, 2021, the contents of which are incorporated herein by reference.

TECHNICAL FIELD

The present disclosure relates to measurements, and in particular to a discontinuous deformation measurement method based on infrared and visible light cameras.

BACKGROUND

For quasi-brittle materials like concrete, rock, and low volume content steel fiber reinforced cement-based composites, etc., the deformation process is usually accompanied by micro-cracks or macro-cracks. The micro-cracks are mainly located around the crack-propagation tip, and they will gradually become macro-cracks with the external load. Based on the traditional digital image correlation technique, Chinese patent NO. CN201810294857.7 discloses a discontinuous deformation measurement method, which can acquire visible images by means of a light camera during the crack propagation process and obtain full-field deformations and crack propagation trajectory of the macro-cracks. However, the present disclosure fails to obtain an accurate crack path and deformation field for the micro-cracks.

SUMMARY OF THE DISCLOSURE

According to the first aspect of the present disclosure, a discontinuous deformation measurement method based on infrared and visible light cameras is provided. The method includes following steps:

Step 1: spraying thermal-conductive paint uniformly on a surface of quasi-brittle materials to form an electrically-conductive film and preparing a random speckle pattern on a surface of the electrically-conductive film.

Step 2: obtaining a visible image and a fusion image of the visible image and an infrared image of the quasi-brittle materials under a loading stage through the infrared and visible light cameras; applying an extending-crack boundary detection to the visible image; under a circumstance that an extending crack is detected, identifying a boundary of the extending crack to obtain a crack-extending region, removing the crack-extending region to obtain a position of a crack-propagation tip, recording the position of the crack-propagation tip as a coordinate of a macro-crack-propagation tip, determining an initial coordinate of a micro-crack in the fusion image based on the coordinate of the macro-crack-propagation tip, and determining a range of the micro-crack based on a temperature-rising region in the fusion image and the initial coordinate.

Step 3: setting a position, corresponding to the range of the micro crack in the fusion image, in the visible image as a new region of interest; obtaining full-field principal tensile strains of the new region of interest by means of a digital image correlation method, and locating an accurate boundary of the micro-crack based on gradient distribution of the full-field principal tensile strains.

In Step 4: an accurate region of the micro-crack defined by the accurate boundary of the micro-crack is removed to obtain a micro-crack removed image, the micro-crack removed image is analyzed by the digital image correlation method to obtain a displacement field and a strain field of the quasi-brittle materials around the micro-crack.

According to the second aspect of the present disclosure, an electronic device is provided. The electronic device may include a non-transitory memory and a processor which are coupled with each other, wherein the memory stores program instructions, and the processor is capable of executing the program instructions to implement the above discontinuous deformation measurement method based on infrared and visible light cameras.

According to the third aspect of the present disclosure, a non-transitory computer-readable storage medium is provided. The non-transitory computer-readable storage medium may have program instructions stored therein. The program instructions are capable of being executed by a processor to implement the above discontinuous deformation measurement method based on infrared and visible light cameras.

BRIEF DESCRIPTION OF THE DRAWINGS

In order to illustrate technical solutions of the embodiments of the present disclosure clearly, accompanying drawings for describing the embodiments will be introduced in brief. Obviously, the drawings in the following description are only some embodiments of the present disclosure. For the person of ordinary skill in the art, other drawings may be obtained based on the provided drawings without any creative work, wherein.

In all the drawings, 1: quasi-brittle material, 2: electrically conductive film and artificial speckle pattern, 3: electrically conductive medium, 4: electricity line, 5: light apparatus, 6: voltage apparatus, 7: infrared camera, 8: visible light camera, 9: data transmission wire, 10: computer.

DETAILED DESCRIPTION

The present disclosure will be described clearly and thoroughly herein by accompanying appended figures of some embodiments. Apparently, the embodiments are only part of the present disclosure and are not the whole disclosure. For the person of ordinary skill in the art, other embodiments may be obtained based on the provided embodiments without any creative work, and the other embodiments are also covered, by the present disclosure.

Figure 1:
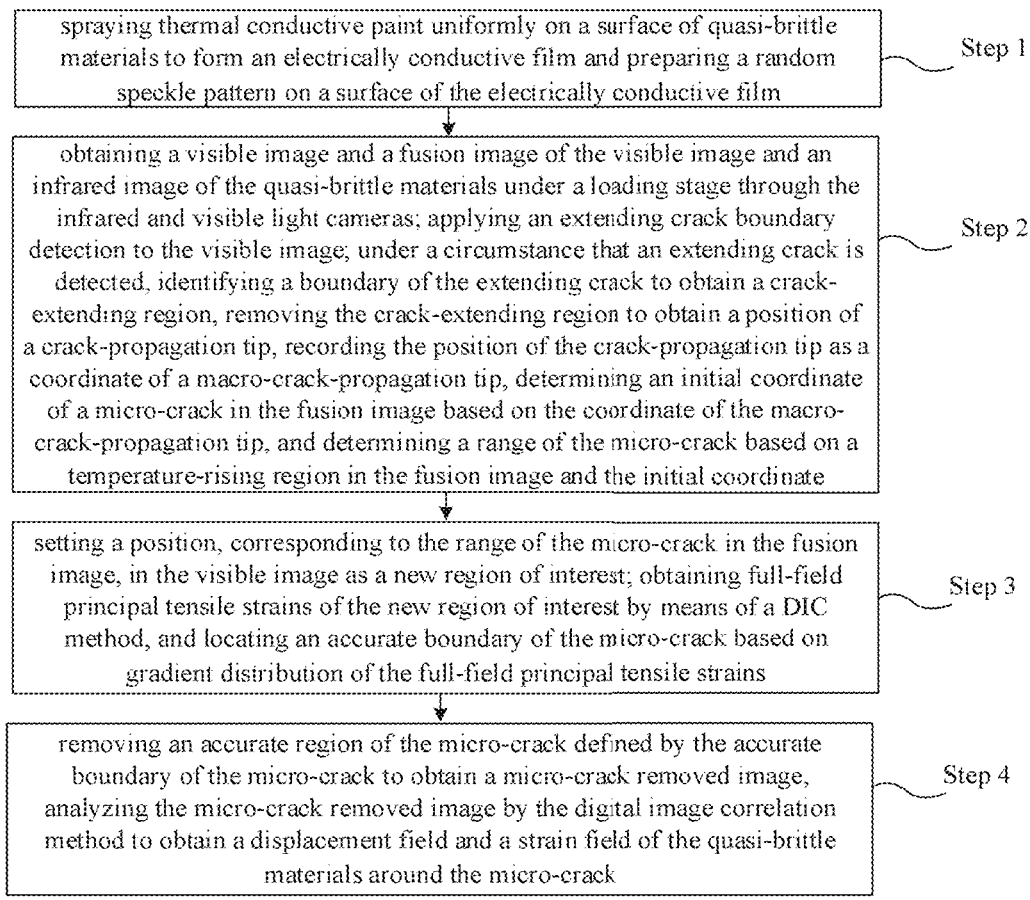
FIG. 1 is a flow diagram of a discontinuous deformation measurement method based on infrared and visible light cameras according to an embodiment of the present disclosure.

Referring to FIG. 1, FIG. 1 is a flow diagram of a discontinuous deformation measurement method based on infrared and visible light cameras according to an embodiment of the present disclosure. Specifically, the method may include the following steps.

In Step 1: thermal conductive paint is sprayed uniformly on a surface of quasi-brittle materials 1 to form an electrically conductive film and a random speckle pattern is prepared on a surface of the electrically conductive film. Next, a dual light fusion camera is placed (comprising an infrared camera 7 and a visible light camera 8) in front of the random speckle pattern surface. Then, voltage is applied from a voltage source 6 to the electrically conductive film through electrically conductive medium 3, and at the same time, universal testing machine is opened to apply loading to the quasi-brittle materials, so as to obtain multiple sets of images during the whole fracture process, wherein each set of images comprises a visible image and a fusion image of the visible image and an infrared image.

Figure 5:
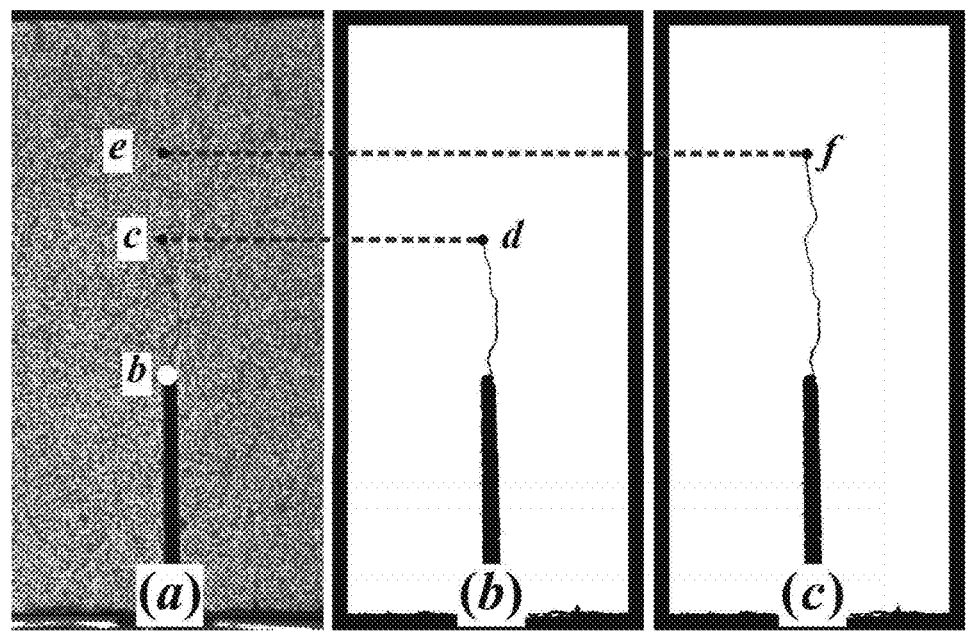
FIG. 5 is the visible image and the crack identification comparison results corresponding to one specific loading stage in example 1.

In Step 2: a coordinate of a macro-crack-propagation tip (the point c as shown in FIG. 5a) is obtained in a region of interest of a visible image under a loading stage based on the method provided by Chinese patent NO. CN201810294857.7, which is hereby incorporated by reference in its entirety; an initial coordinate of a micro-crack in the fusion image is determined based on the coordinate of the macro-crack-propagation tip, and a range of the micro-crack is determined based on a temperature-rising region in the fusion image and the initial coordinate.

Typically, by using a pixel value threshold, a boundary of an extending-crack can be detected and a crack-extending region obtained by the boundary of the extending-crack can be removed.

In Step 3: a position, corresponding to the range of the micro-crack in the fusion image, in the visible image is set as a new region of interest; full-field principal tensile strains of the new region of interest are obtained by means of a digital image correlation (DIC) method, and an accurate boundary of the micro-crack is located based on gradient distribution of the full-field principal tensile strains.

Typically, in order to obtain the new region of interest, an X coordinate of one of the two most marginal points is a maximum value of X coordinates of pixels in the temperature-rising area, and a Y coordinate of the same one as described above of the two most marginal points is a maximum value of Y coordinates of pixels in the temperature rising area; an X coordinate of the other one of the two most marginal points is a minimum value of X coordinates of the pixels in the temperature rising area, and a Y coordinate of the same one as described above of the two most marginal points is a minimum value of Y coordinates of pixels in the temperature rising area.

In Step 4: an accurate region of the micro-crack defined by the accurate boundary of the micro-crack is removed to obtain a micro-crack removed image, the micro-crack removed image is analyzed by the digital image correlation method to obtain a displacement field and a strain field of the quasi-brittle materials around the micro-crack.

By coupling the infrared image and visible image, the present disclosure can automatically obtain the full-field displacements and strains near the micro-crack of the quasi-brittle material, which can be widely used in the field of scientific research and engineering, and this measurement method provides a new idea for the precise identification of the micro-crack.

Figure 4:
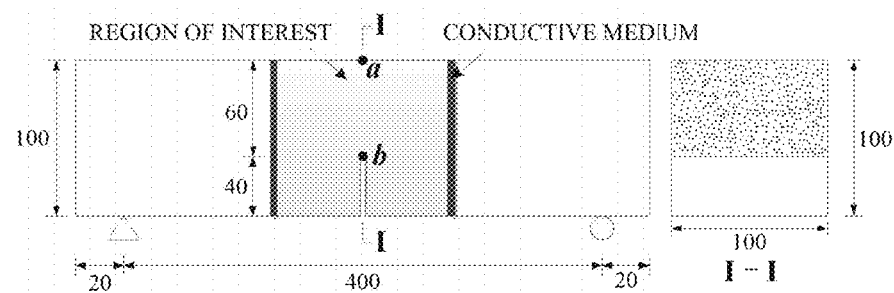
FIG. 4 is a schematic diagram of the electrically conductive film, the distribution of the speckle pattern, and the geometry of the three-point bending beam prepared in example 1.

Referring, to FIG. 4, the detailed preparation process of the electrically conductive film is as follows: Paste the electrically conductive mediums 3 (such as thin copper, shown in FIG. 4) at first on the left and right boundaries of the region of interest, and then spray thermal conductive paint uniformly between the two electrically conductive mediums 3 to form a pathway of the thermal conductive paint and the two electrically conductive mediums.

The electrically conductive film has a certain elongation rate, when there generates micro-crack(s) on the surface of the quasi-brittle materials the resistance value of the electrically conductive film in the micro-crack(s) region will increase and the temperature of the electrically conductive film in the micro-crack(s) region will be significantly higher than the region without crack. With the continuous, propagation of the crack, the electrically conductive film will be broken and can't transmit temperature information.

The speckle pattern is made on the surface of the electrically conductive film, and the detailed preparation process is as follows: spray the white paint uniformly as the background at first, and then spray the black paint randomly to form a speckle pattern.

The cameras used in this method can acquire the fusion image and the visible image simultaneously during the entire crack-propagation process. After the coordinate of the macro-crack-propagation tip is determined, the position of a micro-crack in the fusion image can also be accurately obtained, that is, an initial coordinate of the micro-crack in the fusion image can be determined. Furthermore, the range of the micro-crack can be determined based on the temperature-rising region in the fusion image and the initial coordinate.

Figure 2:
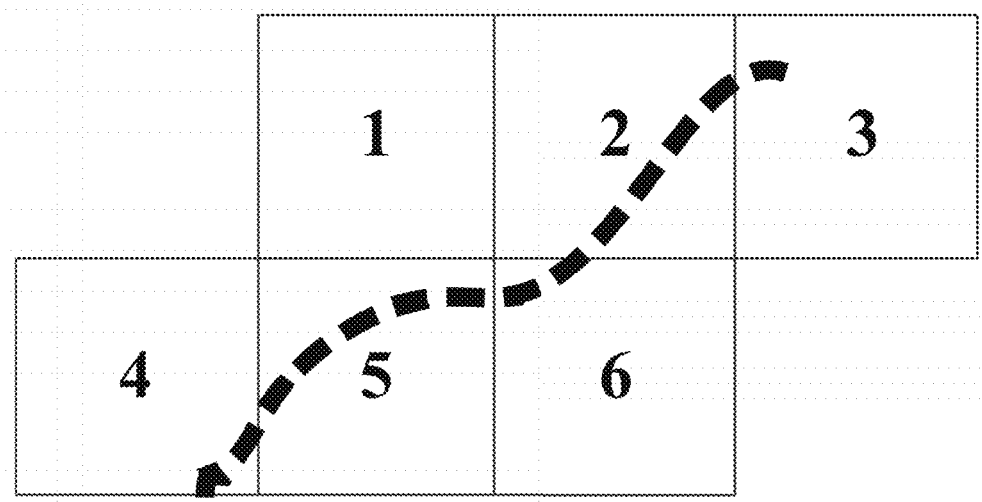
FIG. 2 is a schematic of the temperature-rising region when there shows micro-crack(s) on the surface of the quasi-brittle materials.
Figure 3:
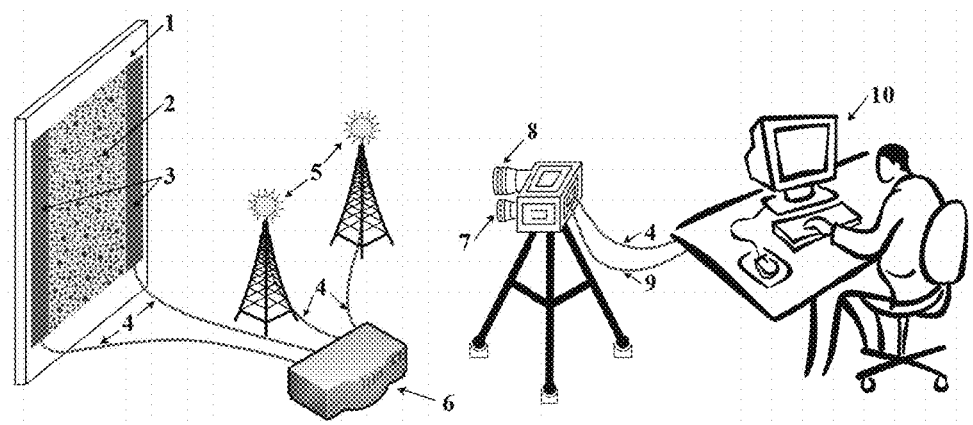
FIG. 3 is a schematic of the stereoscopic view of the apparatus used in the present disclosure.

The reason why only the approximate range of the micro-crack can be determined from the second step is: when there generates micro-crack (the dotted line in FIG. 2) on the surface of the quasi-brittle material 1, the temperature-rising region (rectangles 1~6 in FIG. 2) in the fusion image will be significantly wider than the real crack boundary of the micro-crack, that, is, the accurate boundary of the micro-crack cannot be identified by the temperature-rising region.

Step 3 comprises: first setting a rectangular area, corresponding to the range of the micro-crack in the fusion image, in the visible image as a new region of interest, then analyzing the new region of interest by means of the digital image correlation (DIC) method.

In the full-field principal tensile strains obtained by the DIC method, if the principal tensile strain of pixel A makes a difference of an order of magnitude with the surrounding pixels, pixel A is determined to be a position of the micro-crack, detects all of the positions of the micro-crack which compose the accurate boundary of the micro-crack.

The measurement method can deal with the crack propagation problem under any loading conditions and acquire the fusion image and visible image simultaneously. Based on the visible image, the macro-crack under present loading can be removed and the initial position of the micro-crack can be obtained, and the approximate range of the micro-crack can then be obtained from the fusion image. Finally, the accurate boundary of the micro-crack can be identified by coupling it with the visible image. By coupling the fusion image and visible image, the proposed measurement method can detect, identify and analyze the micro-crack automatically.

Example 1

The experiment was carried out in Hebei University of Technology, and the following materials were used to prepare the notched three-point bending beam: Ordinary Portland cement of grade P.O. 42.5 was used as the binder, natural river sand with a diameter below 5 mm was used as the fine aggregate. Round and straight steel fibers with an equivalent diameter of 0.5 mm and a length of 30 mm were used. The geometry of the specimen is shown in FIG. 4, the external load will be applied to the specimen from point a and point b represents the position of the initial crack tip. The load rate used was 0.15 mm/min, infrared image and visible image were simultaneously acquired after opening the test machine.

Figure 6:
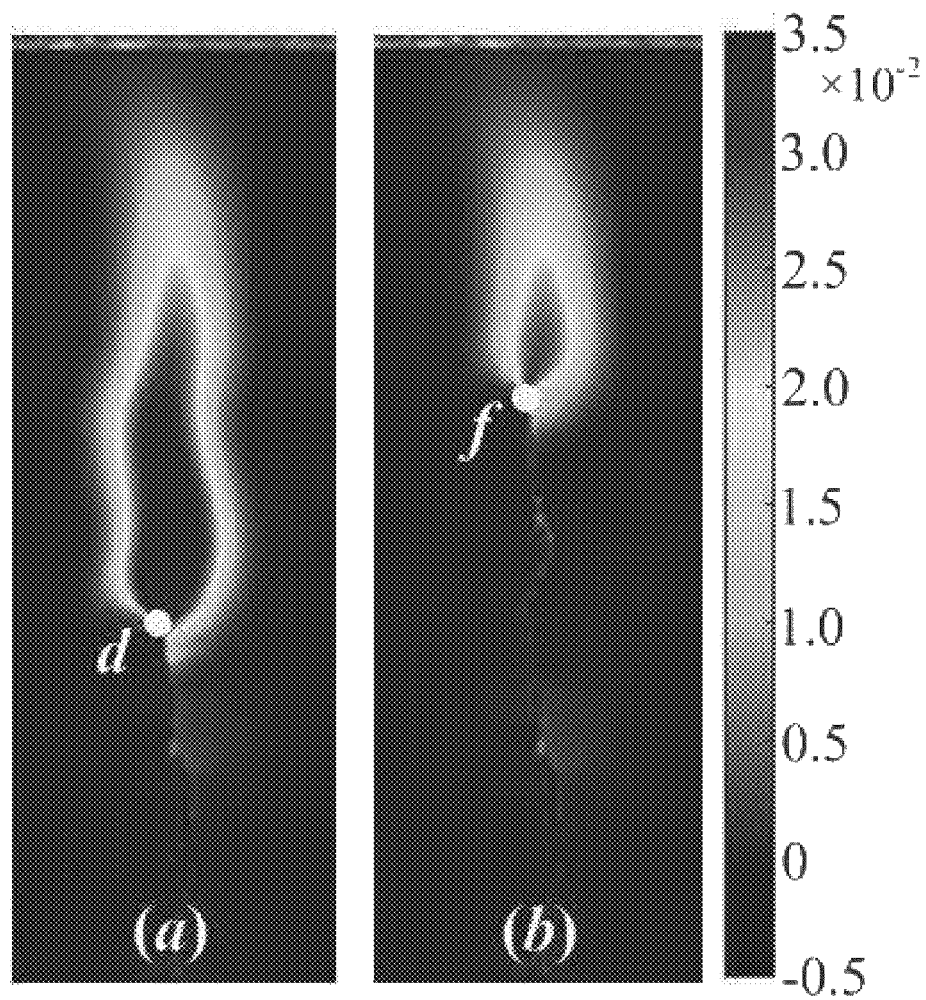
FIG. 6 is the comparison result of the full-field horizontal strains between the patent CN201810294857.7 and the present disclosure (unit: $10^6$ με) in example 1.

Take the descending moment 85% $P_{max}$ ($P_{max}$: peak, load) for example, there shows an obvious crack in front of point b within the visible image (shown in FIG. 5a), FIG. 5b and FIG. 5c show the crack identification result between the patent "A discontinuous deformation measurement method" (CN201810294857.7) and the present disclosure, which can be observed that the present disclosure can obtain the boundary of the micro-crack(s). In addition, the full-field horizontal strains (shown in FIG. 6) indicate that the present disclosure can obtain the accurate position of the crack-propagation tip (FIG. 6b) and more reasonable strain results.

Example 2

Figure 7:
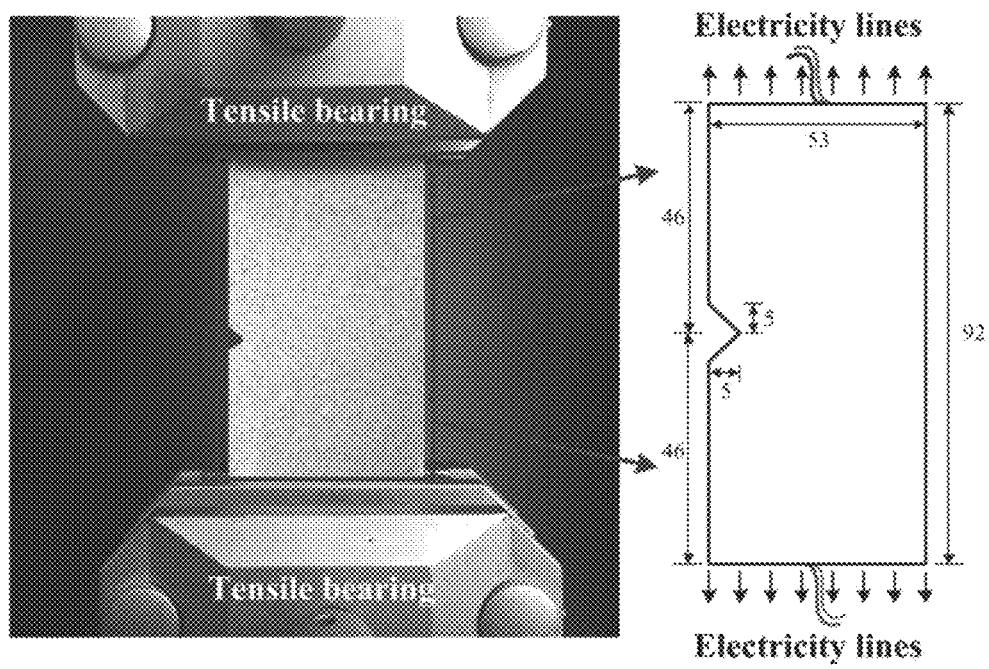
FIG. 7 is a schematic diagram of uniaxial tensile test setup and specimen geometry of the aluminum material in example 2.

The aluminum material with an initial notch on the left side was used to perform the tensile test, the thickness of the material was 0.5 mm. An electrically conductive film was brushed on the material surface in advance, and was connected to the external voltage through electricity lines at both ends of the material. On the surface of the electrically conductive film, a random speckle pattern was prepared to observe the movement of speckle points during the tensile process. The test setup and the geometry of the material are shown in FIG. 7, a universal testing machine with a maximum capacity of 20 kN was used, and the loading rate was 1 min/min.

Figure 8:
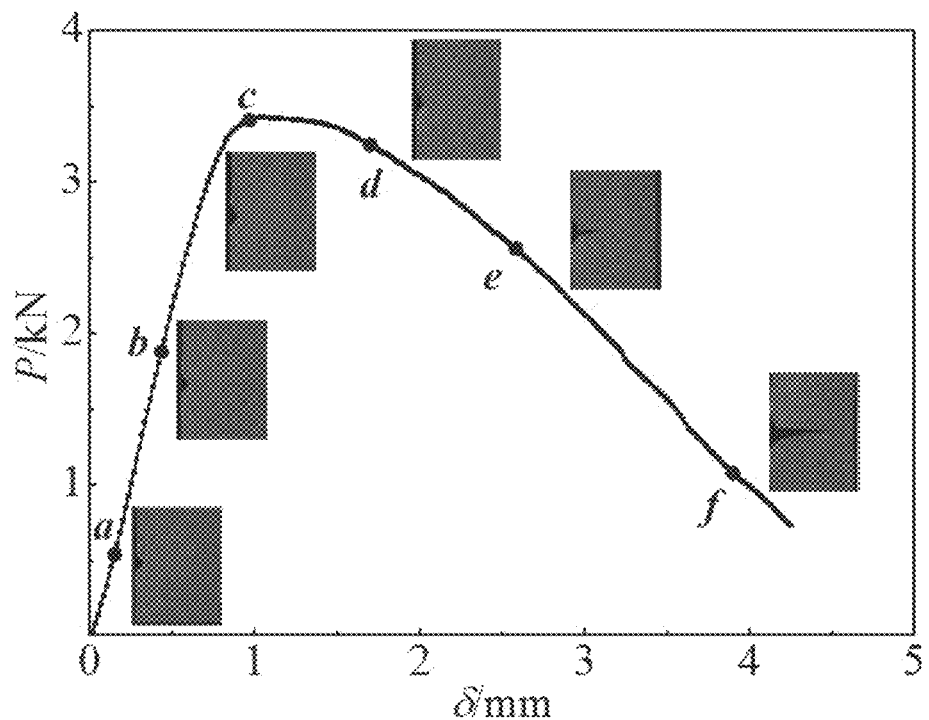
FIG. 8 is a measured load-displacement curve of the aluminum material in example 2.

FIG. 8 shows the measured load-tensile displacement (P-δ) curve, six visible light images that belong to the ascending and descending of the load were selected. It can be seen that with the increasing tensile displacement, a crack starts to show on the prefabricated notch and gradually expands along the horizontal direction; meanwhile, there shows obvious differences in gray value between the cracked and non-cracked regions.

Figure 9:
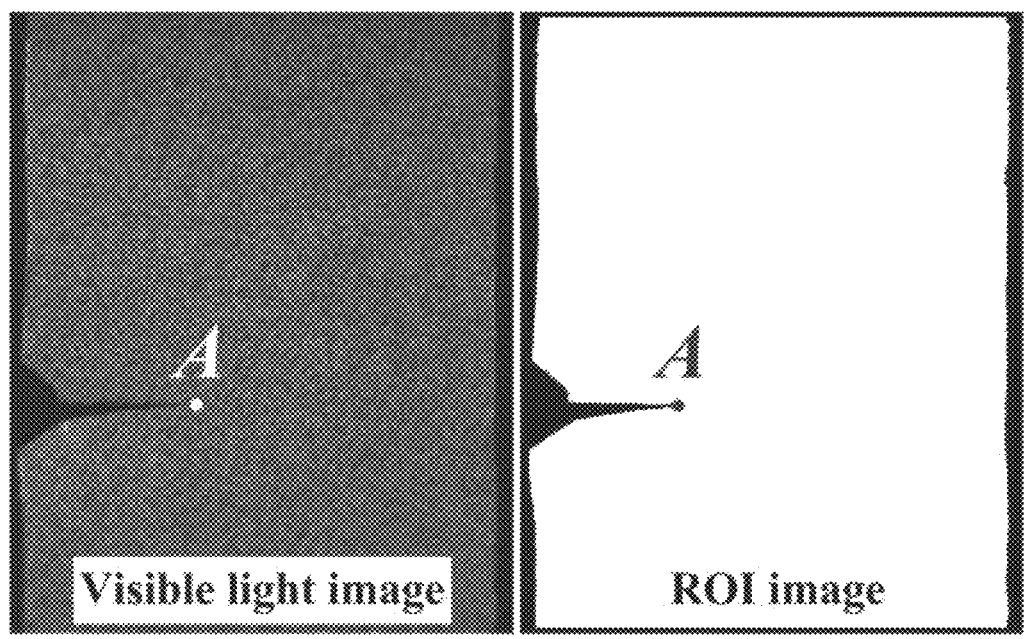
FIG. 9 is a visible light image and ROI image under loading stage e for the aluminum material in example 2.

Take the loading stage e within the measured P-δ curve as an example, the visible light image and the corresponding binary analysis image (or ROI image) are shown in FIG. 9 (where point A represents the endpoint of the macro-crack). It can be observed that the cracked area has been marked as a black color within the ROI image, which means that this region will not be analyzed during the image-matching process.

Figure 10:
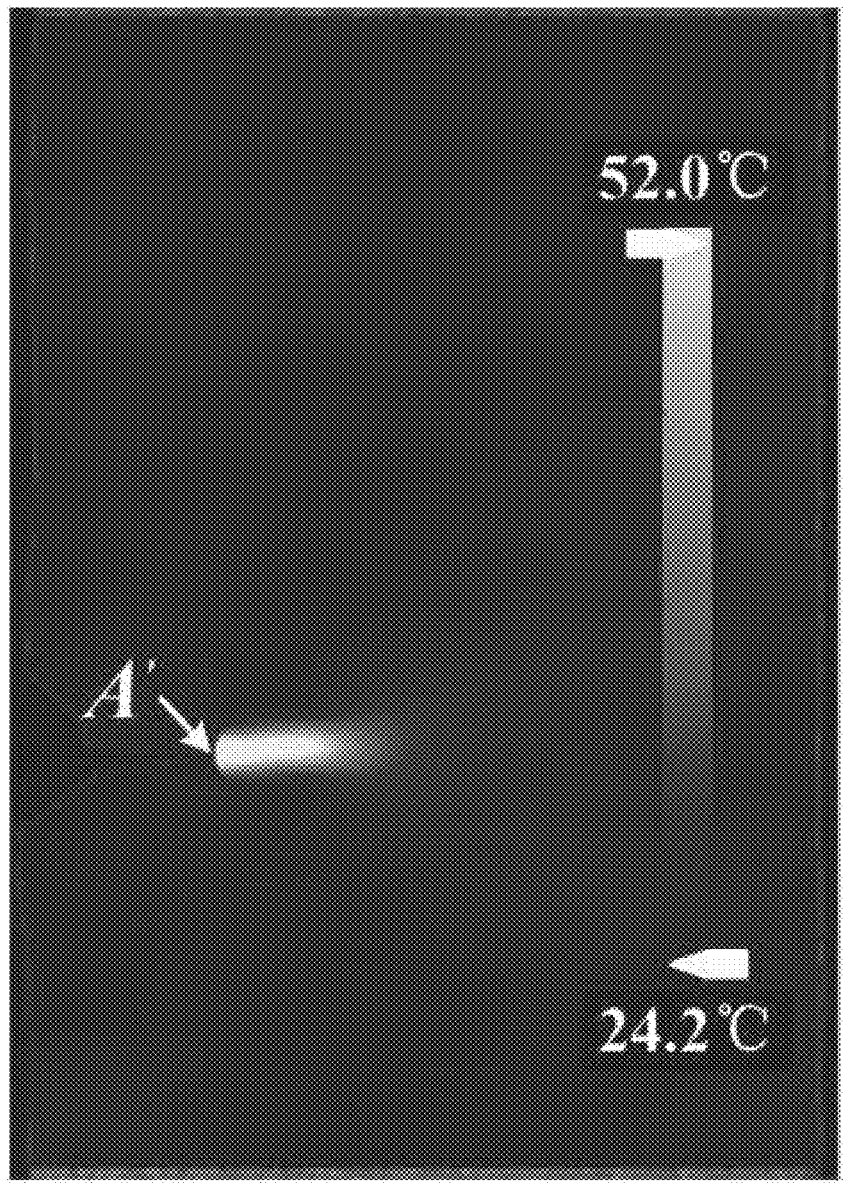
FIG. 10 is infrared image under the loading stage e for the aluminum material in example 2.

FIG. 10 shows the infrared image acquired at the loading stage e, which can be seen that an obvious temperature-rising region is presented near the crack-propagation tip. And point A' is the initial position of the micro-crack, which corresponds to point A in FIG. 9.

Figure 11:
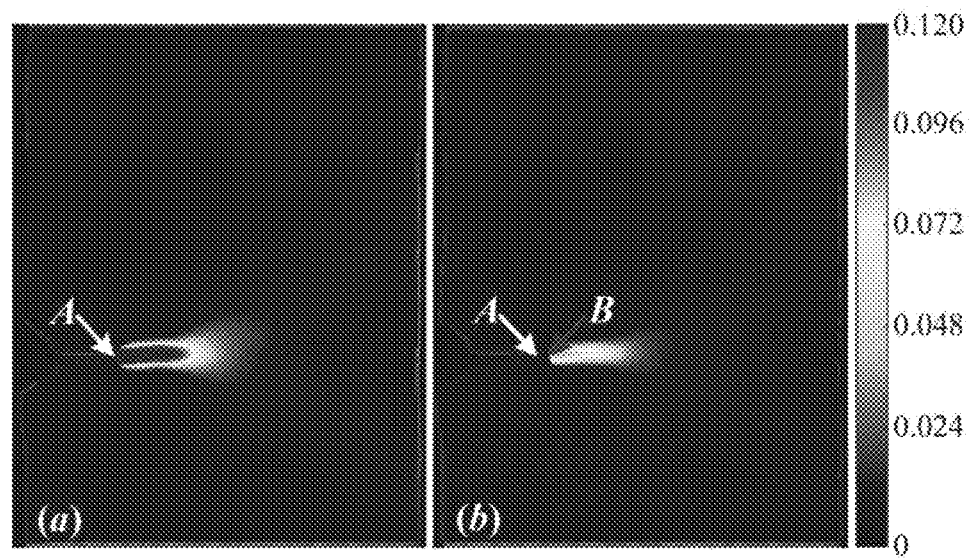
FIG. 11 is a comparison result of the full-field strains along the tensile direction between the patent "A discontinuous deformation measurement method" and the present patent (unit: $10^6$ με) in example 2.

FIG. 11 shows the strain comparison result along the tensile direction between the patent "A discontinuous deformation measurement method" and the current patent. It can be concluded that the method proposed in this patent can identify the position of the micro-crack (B: the endpoint of the micro-crack), and obtain more accurate deformation results around the crack-propagation tip.

Figure 12:
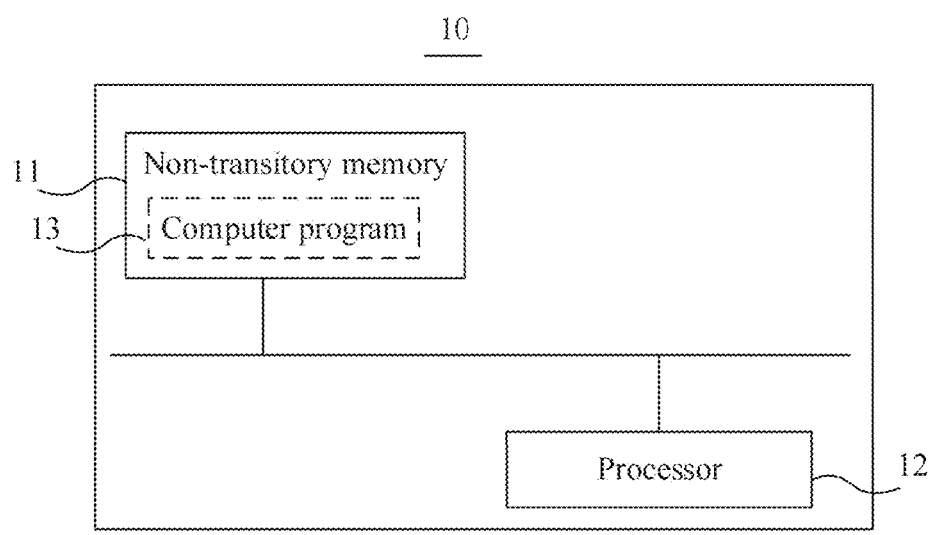
FIG. 12 is a schematic diagram of a framework of the electronic device according to an embodiment of the present, disclosure.

Referring to FIG. 12, FIG. 12 is a schematic diagram of a framework of the electronic device 10 according to an embodiment of the present disclosure. As shown in FIG. 12, the electronic device 10 may include a memory 11, a processor 12 and a computer program 13 stored on the memory 11 and runnable on the processor, and the processor 12 may be configured to implement the discontinuous deformation measurement method based on infrared and visible light cameras in any of the above embodiments of the present disclosure when executing the computer program 13. Specifically, the electronic device 10 may include a cell phone, a tablet computer, a notebook, etc., which will not be, limited by the present disclosure.

Figure 13:
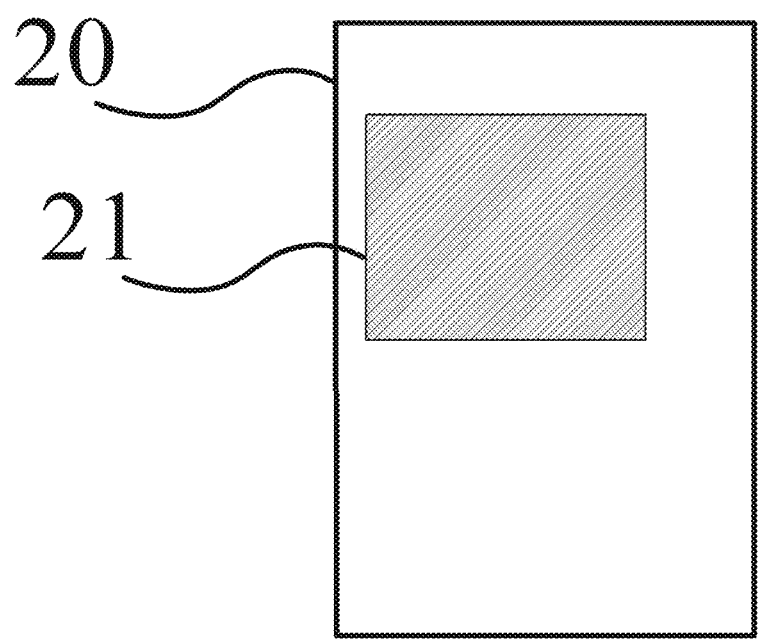
FIG. 13 is a schematic diagram of a framework of the non-transitory computer-readable storage medium according to an embodiment of the present disclosure.

Referring to FIG. 13 FIG. 13 is a schematic diagram of a framework of the computer-readable storage medium 20 according to an embodiment of the present disclosure. As shown in FIG. 13, the computer-readable storage medium 20 may include a stored computer program 21, and the computer program 21 when executed by the processor, may be configured to implement the discontinuous deformation measurement method based on infrared and visible light cameras in any of the above embodiments.

The above description of the various embodiments tends to emphasize the differences between the various embodiments, which are identical or similar enough to be cross-referenced and will not be repeatedly described hereinafter for brevity.

In some embodiments of the present disclosure, understandably, the disclosed methods and devices may be implemented in other ways. For example, the embodiments of the devices described above may merely be schematic, for example, the division of modules or units may serve as a logical functional division only, may be divided in another way when actually implemented, for example, a plurality of units or components may be combined or may be integrated into another system, or some features may be ignored, or not implemented. Moreover, the mutual coupling or direct coupling, or communication connections shown or discussed may be indirect coupling or communication connections through some interface or device, or unit, may be electrical, mechanical, or other forms.

The units illustrated as individual components may or may not be physically separated, and the components displayed as units may or may not be physical units, i.e., the components may be located in one place, or the components may be distributed to a plurality of network units. Some or all of these units may be selected according to practical needs to achieve the purpose of the embodiments.

Alternatively, each functional unit in the various embodiments of the present application may be integrated into a single processing unit, or each unit may be physically present separately, or two or more units may be integrated into a single unit. The above integrated-units may be implemented either in the form of hardware or in the form of software functional units.

The integrated unit, when implemented as a software functional unit and sold or used as an individual product, may be stored in a non-transitory computer-readable storage medium. Understandably, the technical solution of the present disclosure, all or part of the technical solution that essentially contributes to the prior art, may be embodied in the form of a software product that is stored in a storage medium sand includes a number of instructions to allow a computer device (may be a personal computer, server, or network device, etc.) or processor to perform all or some of the operations of the various embodiments of the present disclosure. The aforementioned storage medium includes: USB flash drive, removable hard disk, Read-Only Memory (ROM), Random Access Memory (RAM), disk or CD-ROM, and other media that may store program code.

What is claimed is:

1. A discontinuous deformation measurement method based on infrared and visible light cameras, comprising:

Step 1: spraying thermal conductive paint uniformly on a surface of quasi-brittle materials to form an electrically conductive film and preparing a random speckle pattern on a surface of the electrically conductive film;

Step 2: obtaining a visible image and a fusion image of the visible image and an infrared image of the quasi-brittle materials under a loading stage through the infrared and visible light cameras; applying an extending crack boundary detection to the visible image; under a circumstance that an extending crack is detected, identifying a boundary of the extending crack to obtain a crack-extending region, removing the crack-extending region to obtain a position of a crack-propagation tip, recording the position of the crack-propagation tip as a coordinate of a macro-crack-propagation tip, determining an initial coordinate of a micro-crack in the fusion image based on the coordinate of the macro-crack-propagation tip, and determining a range of the micro crack, based on a temperature-rising region in the fusion image and the initial coordinate;

Step 3: setting a position, corresponding to the range of the micro-crack in the fusion image, in the visible image as a new region of interest; obtaining full-field principal tensile strains of the new region of interest by means of a digital image correlation method, and locating an accurate boundary of the micro-crack based on gradient distribution of the full-field principal tensile strains; and Step 4: removing an accurate region of the micro-crack defined by the accurate boundary of the micro-crack to obtain a micro-crack removed image, analyzing the micro-crack removed image by the digital image correlation method to obtain a displacement field and a strain field of the quasi-brittle materials around the micro-crack.

2. The method of claim 1, wherein the spraying the thermal conductive paint uniformly on the surface of the quasi-brittle materials comprises:

pasting two electrically conductive mediums respectively on a left boundary and a right boundary of a region of interest of the quasi-brittle materials, and spraying the thermal conductive paint uniformly between the two electrically conductive mediums to form a pathway of the thermal conductive paint and the two electrically conductive mediums;

the preparing the random speckle pattern on the surface of the electrically conductive film comprises:

spraying white paint uniformly as a background on the surface of the electrically conductive film, and then spraying black paint randomly to form the speckle pattern.

3. The method of claim 1, wherein the method comprises: obtaining visible images and fusion images of the visible images and infrared images corresponding to a whole crack propagation process comprising conditions of at least one crack at, an initial and a final of the whole crack propagation process.

4. The method of claim 1, wherein the determining the range of the micro-crack based on the temperature-rising region in the fusion image and the initial coordinate comprises:

defining a rectangular area framed by two most marginal pixels in the temperature-rising region as the range of the micro-crack.

5. The method of claim 1, wherein the locating the accurate boundary of the micro-crack based on the gradient distribution of the full-field principal tensile strains comprises;

detecting positions of the micro-crack, which compose the accurate boundary of the micro-crack and each have a principal tensile strain showing an order of magnitude difference with surrounding pixels.

6. An electronic device comprising a non-transitory memory and a processor which are coupled with each other, wherein the memory stores program instructions and the processor is capable of executing the program instructions to implement the discontinuous deformation measurement method based on infrared and visible light cameras of claim 1.

7. A non-transitory computer-readable storage medium, wherein the storage medium has program instructions stored therein, the program instructions are capable of being executed by a processor to implement the discontinuous deformation measurement method based on infrared and visible light cameras of claim 1.

* * * * *